United States Patent [19]

Roos et al.

[11] Patent Number: 4,977,837

[45] Date of Patent: Dec. 18, 1990

[54] PROCESS AND APPARATUS FOR REDUCING HEAVY METAL TOXICITY IN FLY ASH FROM SOLID WASTE INCINERATION

[75] Inventors: Charles E. Roos, Nashville; Ronald A. Quarles, Nolensville, both of Tenn.

[73] Assignee: National Recovery Technologies, Inc., Nashville, Tenn.

[21] Appl. No.: 486,802

[22] Filed: Feb. 27, 1990

[51] Int. Cl.[5] ............................................. F23D 1/00
[52] U.S. Cl. ............................ 110/165 A; 110/216; 110/220; 110/235; 110/345; 110/346
[58] Field of Search ............ 110/235, 346, 220, 165 R, 110/165 A, 216, 345

[56] References Cited

U.S. PATENT DOCUMENTS 4,750,437  6/1988  Rouse ........................... 110/220 X
4,831,943  5/1989  Aune ........................... 110/165 A X
4,915,039  4/1990  Ringel ........................ 110/165 A X Primary Examiner—Edward G. Favors
Attorney, Agent, or Firm—Harrington A. Lackey

[57] ABSTRACT

A process and apparatus for the vitrification of fly ash produced from an incineration system for solid waste materials, including the combining of fly ash extracted from the pollution control device in the incineration system with fusible material, particularly glass, and preferably recycled glass extracted from the solid waste material before it is incinerated, and subsequently melting the combined glass and fly ash in a vitrification furnace in order to vitrify the fly ash and its toxic contaminants, including lead, mercury, cadmium and other heavy metals, to produce an inert vitrified ash product. The flue gas from the vitrification furnace is returned to the flue gas stream from the incinerator for introduction into the pollution control device.

17 Claims, 2 Drawing Sheets

PROCESS AND APPARATUS FOR REDUCING HEAVY METAL TOXICITY IN FLY ASH FROM SOLID WASTE INCINERATION

BACKGROUND OF THE INVENTION

This invention relates to an improved system for the incineration of solid waste materials, and more particularly to the process and apparatus for reducing toxic heavy metals in the fly ash extracted from a solid waste incineration system.

For a number of years, plants for incinerating municipal solid waste have been in operation. Some of these plants convert the solid waste into an energy source for both heating and cooling buildings. Moreover, recently, pollution control units in the form of electrostatic precipitators or dry gas scrubbers are installed downstream of the incinerator furnace to collect and process the effluent flue gas, reducing the waste disposal by-products emitted into the atmosphere to virtually pollution-free water vapor.

An apparatus for incinerating solid waste materials, and particularly municipal solid waste, reduces the total volume of the refuse to approximately one-tenth of its original volume in the form of ash. Thus, a landfill receiving ash from a mass-burn municipal incineration system will last about 10 times longer than if it were filled with the original unburned solid waste.

Conventionally, the fly ash separated by the pollution control device is combined with the ash or "bottom ash" from the incinerator furnace and then transferred to the landfill The incineration treatment of municipal solid waste has been improved by the pre-sorting of non-combustible materials from the original solid waste refuse before introducing the remaining combustible materials into the incinerator furnace. By utilizing such pre-sorting methods, the efficiency of the incineration of the remaining combustible materials has been improved. The sorted combustible waste burns at a higher and more consistent temperature; the rate of disposal of the refuse increases; and the toxic materials remaining in both the bottom ash and the flue gases, as well as the fly ash, are reduced. Moreover, where a municipal solid waste incineration system is utilized for conversion of some of the waste material into energy for heating a boiler, the efficiency of the boiler has been improved by the pre-sorting of the solid waste refuse.

Furthermore, it has been found in pre-sorting of solid waste material that the ash remaining from the incinerated combustibles is about half the volume of the ash produced in an incinerator furnace in which none of the refuse was pre-sorted. Moreover, the amount of heavy metals in both the bottom ash and the fly ash is significantly reduced in the total incineration system by pre-sorting the refuse to remove such non-combustible materials as metals, both ferrous and non-ferrous, glass, plastics, dirt and heavy organic material.

Nevertheless, even in a mass incineration system for municipal solid waste material including both an efficient pollution control device and a pre-sorting apparatus, it has been found that the fly ash still retains small, but significant, amounts of heavy metals, and particularly lead, cadmium, and mercury, even though the pre-sorting process removes about 75% of the total mercury and cadmium and about 70% of the total lead in the solid waste refuse.

Differences in removal rates for heavy metals can be due to the existence of heavy metals in chemicals that were not physically or magnetically removed with the pre-sorted metals. For example, certain chemicals, such as paint pigments, plastics, inks, and other chemicals contain lead which would enter the incinerator furnace.

Of course, most lead occurs in lead-acid storage batteries. In the case of pre-sorting municipal refuse, most of the batteries are removed. However, there are some incinerator systems which do not utilize pre-sorting.

Although the electrodes in a lead-acid battery are made of pure lead and lead dioxide, and both of these components are inert at ambient or room temperature, nevertheless, when lead is burned or incinerated, it will be converted into lead monoxide at temperatures above 1,020 deg. F. During incineration, both lead and lead dioxide, insoluble in water, are both converted into lead monoxide at the elevated temperatures above 1,020 deg. F. Lead monoxide and water vapor combine to form lead hydroxide at temperatures below 293 deg. F., and lead hydroxide has a cold-water solubility of 155 ppm (parts per million).

Since municipal waste incinerator furnaces must operate at temperatures above 1,800 deg. F., under EPA (Environmental Protection Agency) standards in order to safely dispose of all toxic organics, chemicals, and plastic materials, any lead contained in refuse within such an incinerator will be substantially converted to lead monoxide and subsequently to lead hydroxide. After the materials are cooled, the toxic soluble lead hydroxide will eventually end up in the bottom ash, the fly ash, or the atmosphere. An efficient pollution control system will transfer the metal oxides from the flue gas to the fly ash.

Since the fly ash is combined with the bottom ash and ultimately is deposited in a landfill, the soluble lead hydroxide will be subjected to leaching into the soil and possibly into the underground water streams over a period of time.

Under EPA standards, the ash that tests above 5 ppm (parts per million) for lead is considered toxic and requires special treatment. Ash and fly ash from some state-of-the-art solid waste incineration systems, even including a pollution control unit and a system of pre-sorting or recycling the refuse before entry into the furnace, still register values greater than 5 ppm on the EPC toxicity test. Thus, even though a highly efficient pollution control unit and/or a highly efficient pre-sorting system is utilized in the mass incineration of municipal solid waste, the toxicity test for lead in ash sometimes reveals acceptable values, but more often is exceeded.

Under the present state-of-the-art, some solutions for removal of heavy metals from the ash from the solid waste incineration systems have been proposed, as illustrated in U.S. Pat. No. 4,737,356 issued to O'Hara et al on Apr. 12, 1988. Such prior art processes include the addition of lime, phosphates and other chemicals to the ash or fly ash.

It is also known that the American Society of Mechanical Engineers is proceeding with a research project to vitrify municipal solid waste incinerator ash residue with the intention of determining whether vitrification eliminates the prospect of leaching from ash. However, Applicant is without knowledge of any other information regarding the status of such research project or any details of such project, and particularly is without any knowledge of any details of the steps in carrying out such procedure or any apparatus to be utilized in the research project.

SUMMARY OF THE INVENTION

It is therefore an object of this invention to provide a process and apparatus for reducing the toxicity of heavy metals in fly ash extracted from a solid waste incineration system by the vitrification of the fly ash.

Another object of this invention is to provide a method for vitrifying the fly ash extracted from a pollution control device in an existing solid waste incineration system with a fusible material, and returning the flue gases from the vitrifying process to the pollution control device, which processes both the flue gases from the vitrifying process and from the mass incineration of the solid waste.

A further object of this invention is to provide a method of reducing the toxic heavy metals in fly ash by mixing the fly ash with the glass pre-sorted from the refuse obtained prior to the introduction of the refuse into the incinerator furnace, and then melting the combined fly ash and glass in a vitrification furnace to produce an inert vitrified ash of low or immeasurable toxicity.

Another object of this invention is to provide a method of mixing the fly ash extracted from the pollution control device in an existing solid waste incineration system with a fusible or glass material, melting the glass material mixed with the fly ash to produce an inert vitrified ash product which may be combined with the bottom ash from the incinerator furnace as an inert non-toxic material.

DESCRIPTION OF THE PREFERRED EMBODIMENTS

Figure 1:
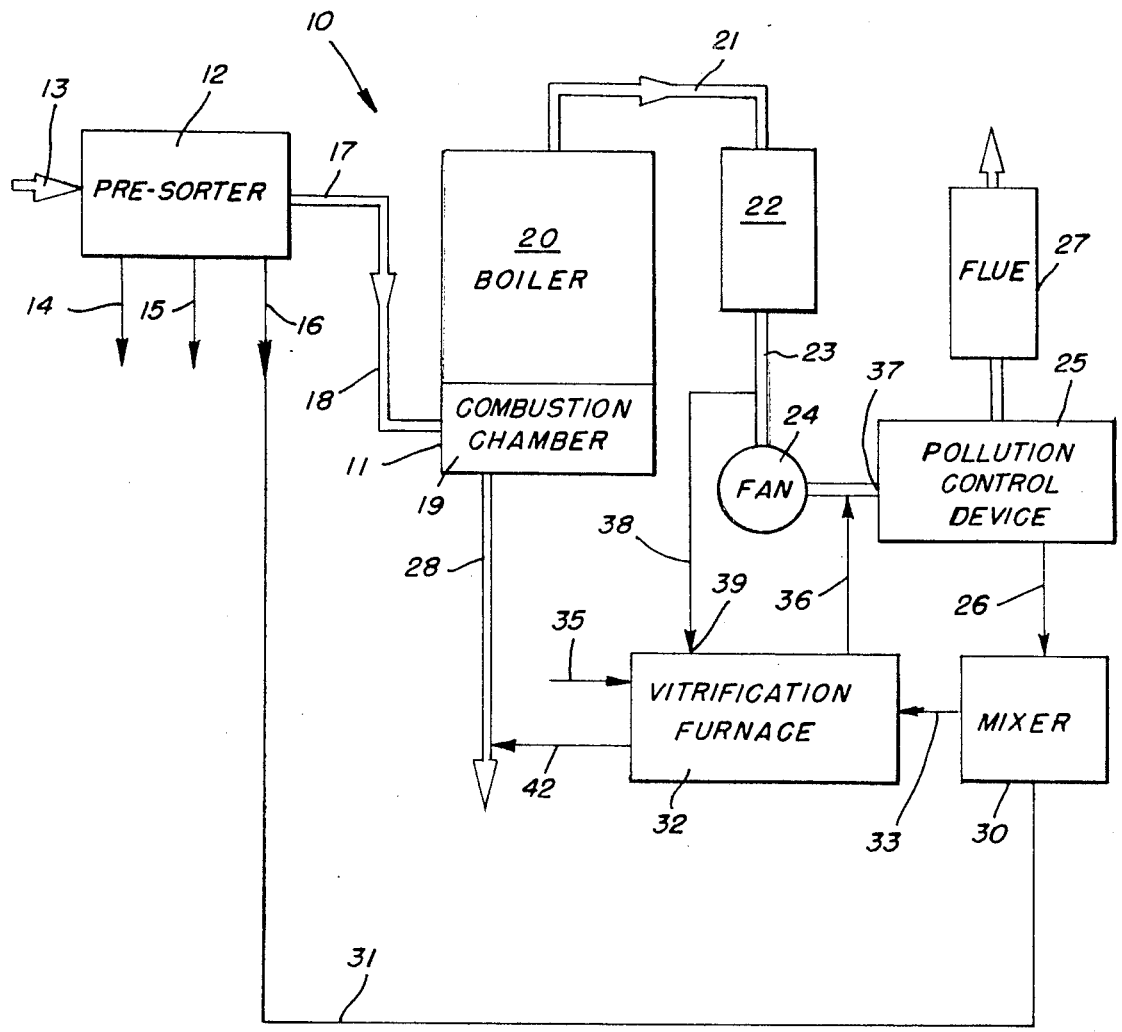
FIG. 1 is a schematic diagram illustrating the process of reducing heavy metals in fly ash from solid waste incineration, in accordance with this invention.

Referring now to the drawings in more detail, FIG. 1 discloses a schematic diagram of the solid waste incinerator system 10 incorporating the method and apparatus made in accordance with this invention for treatment of fly ash.

The incinerator system 10 includes a conventional incinerator or primary furnace 11 having a combustion chamber 19 for burning solid waste material. In the particular system 10 disclosed in FIG. 1, the incinerator furnace 11 is preceded by a pre-sorter system or plant 12 which is utilized to initially separate primarily non-combustible materials from the more combustible materials in order to increase the efficiency as well as the economy of the system 10, by initially recovering recyclable materials.

Municipal solid waste is introduced into the input end 13 of the pre-sorter plant 12 for the separation of the solid refuse into component combustible and non-combustible parts, such as metals, glass, plastics, dirt, grit, and heavy organic material as non-combustibles, and paper, wood, and other organic materials as combustible material. The pre-sorter plant 12 may be of any known type, such as those disclosed in the following U.S. Pat. Nos.:

| | | |
|---|---|---|
| 4,069,145 | Sommer et al | Jan. 17, 1978 |
| 4,533,053 | Kenny et al | Aug. 6, 1985 |
| 4,541,530 | Kenny et al | Sep. 17, 1985 |

The pre-sorter plant 12 separates the solid waste material by gravity, by tumbling, by magnets and/or by fluid selection, such as an air jet separator. If desired, the solid waste material may be shredded before pre-sorting, and may also go through a site where the solid refuse is hand picked. In FIG. 1, the ferrous metal outlet is illustrated at 14, the non-ferrous metal fraction outlet is illustrated at 15, and the glass fraction is shown being extracted at outlet 16. The combustible material, such as paper and organic garbage is withdrawn through the outlet 17 and into the combustible solid waste conduit or stream 18, which is fed into the combustion chamber 19.

The hot gases are re-circulated within the combustion chamber 19 until complete combustion occurs. Then the hot flue gases may move upward through a boiler 20, if desired, in order to heat water which may be utilized for the heating or air conditioning of buildings. The flue gases are then discharged from the furnace 11 through an outlet conduit 21 to carry the flue gases to a heat exchanger 22, if desired. The heat extracted from the hot flue gases in the heat exchanger 22 may be utilized to pre-heat the combustible materials in the conduit 18 before being introduced into the combustion chamber 19, if desired. The heat exchanger 22 might be used to produce low grade heat for any other pre-heating or other heating purposes.

The incineration in the combustion chamber 19 is carried out at a temperature of at least 1,800 deg. F. as required by EPA standards. When the flue gas is discharged from the boiler 20, the temperature of the flue gas may be at approximately 800 deg.–1,000 deg. F. and is then reduced by the heat exchanger 22 to approximately 600 deg. F.

The flue gas from the heat exchanger 22 may be drawn through a conduit 23 by a fan 24 to a pollution control device 25 of known construction. The pollution control device 25 may be a conventional electrostatic precipitator or it may be a dry gas scrubber, so long as it is efficient enough to extract a fine solid particulate material within the flue gas, such as fly ash. The fly ash is discharged through the fly ash outlet 26 of the pollution control device 25, while the substantially clean flue gas from the pollution control device 25 is discharged through the flue 27 into the atmosphere.

The heavier ash material, or bottom ash, remaining in the incinerator furnace 11 may be removed through the bottom ash outlet and discharge path or conduit 28 into an ash pile, not shown, for subsequent removal to a landfill, or for any other use.

The elements thus far described, as well as the process for incinerating and treatment of solid waste material, are known in the art.

In the process for reducing heavy metals in fly ash in accordance with this invention, the fly ash from the outlet 26 from the pollution control device 25 is transferred to a mixer 30, such as a hopper, or even a mechanical mixing device. Also introduced into the mixer 30 is a fusible material, such as a glass material, or even a clay material. In the preferred form of the process, glass material, which has been pre-sorted in the pre-sorter plant 12 and extracted through the glass outlet 16 is transferred to the mixer 30 through the conduit or path 31.

In a preferred form of the invention, equal amounts by weight of fly ash and glass are mixed or combined in the mixer.

The mixture of fly ash and glass is transferred from the mixer 30 into a vitrification or ash/glass furnace 32, through the materials inlet conduit 33.

The vitrification furnace 32 may be heated by any convenient heating means, such as the fuel gas burner 34 within the furnace 32 supplied with fuel gas through the gas inlet 35. The heat provided by the burner 34 is great enough to melt the fusible material, and if glass is the fusible material, then the temperature should be approximately 1,200 deg. F.

The flue gas in the vitrification furnace 32 is discharged through the gas outlet conduit 36 which is in fluid communication with the main flue gas line 23 upstream from the inlet port 37 into the pollution control device 25. In this manner, the pollution control device 25 is utilized to treat the flue gases not only from the main combustion chamber 19, but also from the ash/glass furnace 32.

If desired, a bypass flue gas line 38 may be connected into the main flue gas conduit 23 downstream from the heat exchanger 22, with its opposite end connected to a flue gas inlet 39 communicating with the interior of the vitrification furnace 32.

The molten mixture 40 of the glass and the fly ash (FIGS. 2 and 3) is discharged from the furnace 32 through an outlet port 41 where it is transferred through the path or conduit 42 to any desired discharge place, as a solid, inert, vitrified ash product. As shown in FIG. 1, the vitrified ash product is transferred through the path 42 to the discharge path 28 of the bottom ash so that the vitrified fly ash and the bottom ash are combined and may be transferred to a landfill, or to any other depository for use as a by-product, such as road bed foundation material or coarse aggregate for concrete.

Figure 2:
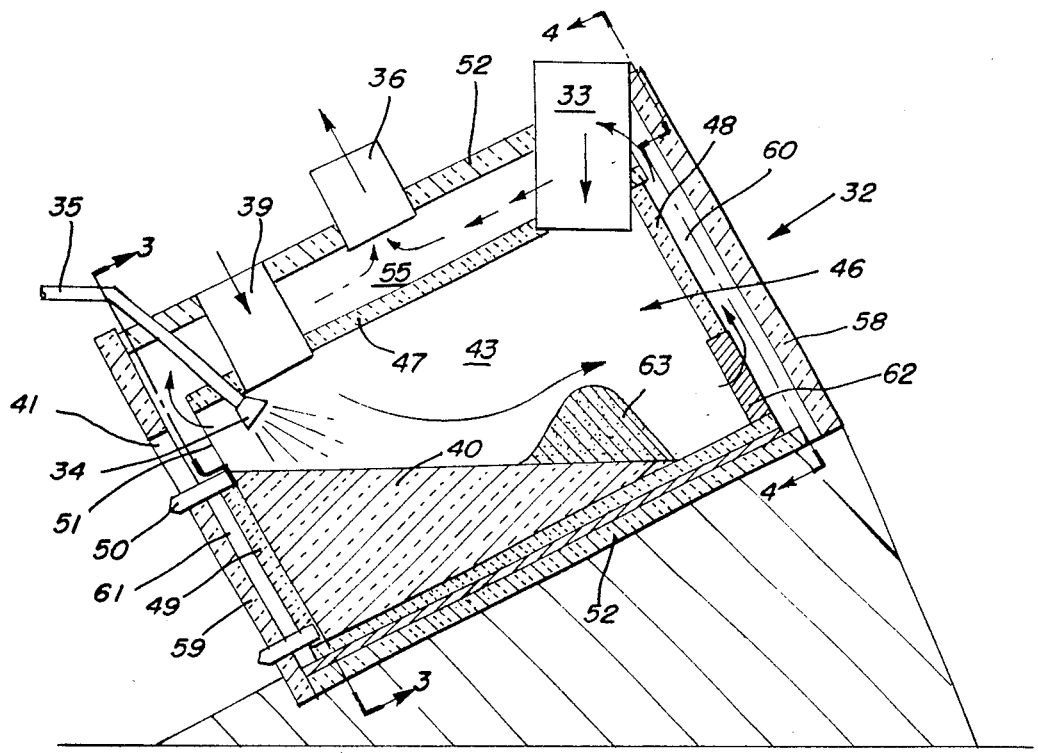
FIG. 2 is a schematic sectional elevation of the vitrification furnace utilized in accordance with this invention.
Figure 3:
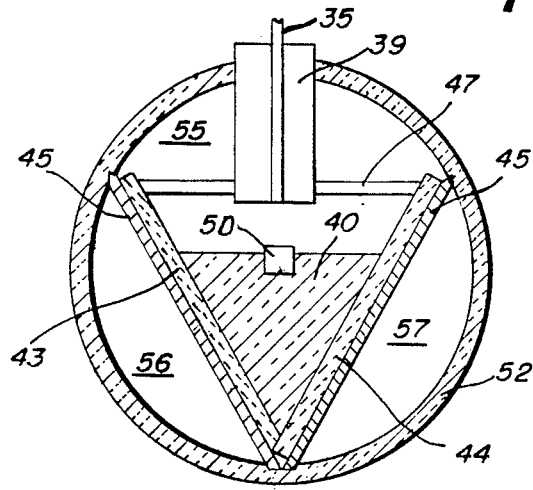
FIG. 3 is a section taken along the line 3—3 of FIG. 2.
Figure 4:
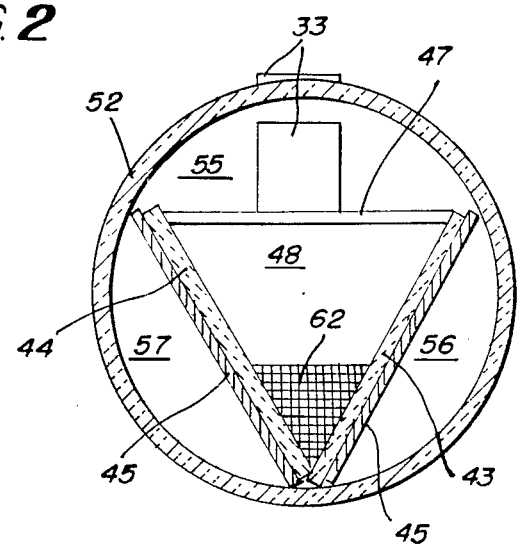
FIG. 4 is a section taken along the line 4—4 of FIG. 2.

FIGS. 2, 3, and 4 disclose schematically a preferred form of the vitrification furnace 32 made in accordance with this invention. The furnace 32 includes a pair of inner side walls 43 and 44, preferably made of fire brick, converging downwardly in a V-cross-sectional shape, and are supported by a V-shaped steel frame 45. The upper portion of the furnace chamber 46 is partially enclosed by a top or upper wall 47. The upper end portion of the chamber 46 is closed by an upper end wall 48, while the lower end is partially enclosed by the lower end wall 49, which terminates at its upper edge in a pour lip 50 to define an outlet port 51 with the upper or top wall 47.

It will be noted in FIG. 2, that the furnace 32 is disposed at an angle to the horizontal with the pour lip 50 and outlet ports 51 and 41 at the lower end portion of the furnace chamber 46.

All of the inner walls 43, 44, 47, 48, and 49 may be made of any type of refractory material, such as fire brick.

A cylindrical exterior wall or jacket 52 surrounds the interior side walls 43 and 44 and the top wall 47 to provide an upper air space or flue gas plenum 55 and side air spaces 56 and 57.

The cylindrical jacket 52 is closed at its ends by the upper end wall 58 and the lower end wall 59, and are spaced outwardly from the corresponding inner end walls 48 and 49 to provide an upper air or flue gas space 60 and a lower air or flue gas space 61. All of the air or flue gas spaces 55, 56, 57, 60 and 61 provide insulation for the furnace walls. The cylindrical jacket 52 and the end walls 58 and 59 are also formed of thermal insulation material of any desired type, in order to insulate the air or flue gas spaces between the outer jacket walls and the interior furnace walls.

Formed in the lower portion of the upper interior end wall 48 is a flue gas port 62 through which flue gases from the interior chamber 46 may flow into the upper end flue gas space 60.

As disclosed in FIGS. 2-4, the materials inlet conduit 33 extends downward through the top portion of the jacket wall 52 and the top interior wall 47, and through the upper space 55 to discharge into the upper portion of the furnace chamber 46. Any mixed materials, such as the mixture of fly ash and glass will be deposited directly through the materials inlet conduit 33 upon the bottom portion of the chamber 46 in an initial pile, such as the pile 63 illustrated in FIG. 2.

The flue gas outlet conduit 36 extends only through the top portion of the jacket wall 52 and communicates with the upper air space 55, as illustrated in FIG. 2.

The flue gas inlet 39 extends through the top portion of the jacket wall 52, the air space 55, and the top wall 47 to discharge the by-pass flue gas directly into the lower end portion of the furnace chamber 46, as disclosed in FIG. 2. The main purpose of the by-pass flue line 38 is to permit hot flue gas at a lower temperature, such as 600 deg. F., to be drawn from the main flue gas conduit 23 and discharged into the furnace chamber 46 in order to pre-heat the ash/glass mixture in the furnace chamber 46.

It will be noted that since the materials inlet conduit 33 and the flue gas inlet 39 are fixed in both the interior and exterior furnace walls, and are surrounded by the gas space 55, the conduits 33 and 39 will also be pre-heated by the flue gases discharging through the outlet port 62 from the furnace chamber 46 into the spaces 60 and 55.

The tilting of the furnace 32 at an angle to the horizontal permits the molten ash/glass 40 to discharge by gravity when sufficient material has been melted to attain the elevation of the pour lip 50, so that during a continuous process, the molten ash/glass is continually flowing over the pour lip 50 and along the path 42 until it solidifies. The tilting of the furnace 32 provides a greater area or volume within the furnace chamber 46 above the level of the molten glass 40 than it would if the longitudinal axis of the furnace 32 were horizontal.

In the operation of the solid waste incinerator system 10 made in accordance with this invention, the apparatus for vitrification of the fly ash and glass, in order to neutralize the heavy metals from the ash, is added to the existing solid waste incineration system, preferably including a pre-sorting system. The same pre-sorter 12, furnace 11, heat exchanger 22, and pollution control device 25, which may be used in the conventional solid waste incineration system, are utilized. The materials inlet conduit 33 to the vitrification furnace 32 is in communication with the fly ash outlet 26 of the existing pollution control device 25 through a mixer 30. Glass, such as waste bottle glass or container glass, from the pre-sorter 12 may be supplied to the mixer 30 through the path or conduit 31.

Most importantly, the flue gas outlet 36 from the vitrification furnace 32 is fed back into the mainstream of the flue gas conduit 23 before the flue gas is introduced into the inlet 37 of the pollution control device 25. Thus, the pollution control device 25 is active upon the flue gas not only from the combustion chamber 19, but also from the vitrification furnace 32.

As an added feature of improved efficiency, the flue gas stream 23 from the heat exchanger 22 may be tapped by the bypass line 38, in order to introduce flue gas at a lower temperature into the vitrification furnace 32 in order to pre-heat the combustion chamber 46 within the furnace 32.

Moreover, the ash/glass product produced by the vitrification furnace 32 can be discharged through the path 42, in order to be mixed with the bottom ash from the furnace 11, such as in the outlet stream path 28.

After the ash/glass mixture is melted within the furnace chamber 46, and discharged over the pour lip 50 into the outlet stream 42, the molten mixture solidifies into a solid glassy product in which all of the fly ash, including all of the heavy metals in the fly ash, are permanently confined within the end product. In this form, the heavy metals, and particularly lead and cadmium cannot be leached from the glassy end product since they are permanently combined, encapsulated, or fused within the glass.

One such end product including a mixture of 50% fly ash and 50% waste bottle glass was analyzed, with the following results:

heavy metals in the fly ash are rendered measurably non-toxic.

When a pre-sorter system 12 is used in combination with the mass incinerator system and the vitrification furnace 32, lesser amounts of bottom ash and fly ash, and therefore heavy metals, are processed, than in such a system without any pre-sorter apparatus.

Furthermore, when a pre-sorter 12 is included in the incinerator-vitrification system of this invention, the higher percentage of combustible materials produces higher burn temperatures, which in turn drives more of the heavy metals into the flue gas and fly ash, than into the bottom ash. Accordingly, Applicant's vitrification furnace 32 will vitrify and neutralize a higher percentage of heavy metals in the total ash product (bottom ash and fly ash), than would be possible in an incinerator system without a pre-sorter.

It is therefore apparent that a system for removing the heavy metals from the fly ash or the flue gas in a conventional system for incinerating solid waste products has been developed in which a vitrification furnace is connected to the existing downstream flue gas conduit in advance of the pollution control device and the fly ash discharged from the pollution control device, as well as waste glass material are introduced into the vitrification furnace. This system eliminates the heavy metals in the fly ash by fusing them into a solid inert mass which might be utilized as a useful by-product. In any event, the solid inert material may be discharged for deposit in a landfill without danger of leaching any of the heavy metals into the ground or aquifers which might interfere with human consumption of water or agricultural products.

| E.P. TOXICITY LEACHATE | | METHOD NUMBERS | PAGE NO. |
|---|---|---|---|
| Total Metals | | EPA SW-846 | Method 8.49 |
| | | EPA 600/4-79-020 | Section 200 |
| Arsenic | 2.00 micrograms/L | | |
| | (ppb) | EPA SW-846 | Method 8.51 |
| Barium | <0.10 ppm | EPA SW-846 | Method 8.52 |
| Cadmium | <0.05 ppm | EPA SW-846 | Method 8.53 |
| Chromium | <0.25 ppm | EPA SW-846 | Method 8.54 |
| Lead | <0.10 ppm | EPA SW-846 | Method 8.56 |
| Mercury | <0.50 micrograms/L | | |
| | (ppb) | EPA SW-846 | Method 8.57 |
| Selenium | 7.10 micrograms/L | | |
| | (ppb) | EPA SW-846 | Method 8.59 |
| Silver | <0.06 ppm | EPA SW-846 | Method 8.60 |
| Initial pH | | 6.50 | |
| Amount of Acetic Acid Added | | 0.10 ml | |
| Final pH | | 5.10 | |
| Sample Weight | | 70.25 g | |

NOTE:
The extraction was performed in accordance with "Test Methods for the Evaluation of Solid Waste, Physical/Chemical Methods", SW-846, U.S. Environmental Protection Agency Office of Solid Waste, Second Edition, 1982, Washington, D.C.

The results of the above analysis reveal that the levels of barium, cadmium, chromium, lead, mercury, and silver are all substantially less than the lower detection limits of the E.P. Toxicity Test. The amount of lead is less than 2% of the 5.0 ppm limit for a toxic material established by the EPA. The measured levels for arsenic and selenium are given in parts per billion (ppb), which is 1,000 times lower than the usual unit toxicity measurement, namely parts per million (ppm).

It will be understood that ratios of the vitrifiable mass, such as glass, and fly ash, other than 50%—50% may be utilized so long as all of the fly ash is combined in the vitrified mass, such as glass, to the extent that the

What is claimed is:
1. A process for treating solid waste materials comprising the steps of:
   (a) incinerating solid waste materials including at least some combustible materials to produce flue gases including fly ash, and bottom ash,
   (b) introducing a glass material into a vitrification furnace,
   (c) introducing said fly ash produced by said incinerating step into said vitrification furnace,
   (d) melting said glass material in said vitrification furnace to cause said fly ash to combine with said molten glass material; and

(e) discharging said combined glass material and fly ash from said vitrification furnace to produce an inert vitrified ash product.

2. The process according to claim 1 further comprising the step of mixing said fly ash and said glass material before introducing said glass material and said fly ash into said vitrification furnace.

3. The process according to claim 2 further comprising the step of separating said fly ash from said flue gases prior to the step of mixing said fly ash with said glass material.

4. The process according to claim 3 in which said step of separating said fly ash from said flue gases comprises separating said fly ash in a pollution control device having an inlet receiving the flue gases after the step of incinerating said solid waste materials, and further comprising the step of discharging any flue gases said vitrification furnace into said inlet of said pollution control device.

5. The process according to claim 4 further comprising the step of introducing a portion of the flue gas from the incinerating step into said vitrification furnace for supplying heat to said vitrification furnace.

6. The process according to claim 1 further comprising the step of combining said vitrified ash product with said bottom ash.

7. The process according to claim 1 further comprising the step of pre-sorting said glass material from said solid waste materials before said incinerating step to provide said glass material for combining with said fly ash.

8. The process according to claim 1 further comprising the step of pre-sorting solid waste materials before said incinerating step into substantially non-combustible materials and substantially combustible materials, and utilizing only said substantially combustible materials in said incinerating step.

9. In a process for treating solid waste materials including a primary furnace for mass burning the solid waste material, a flue gas conduit for removing flue gases including fly ash from the primary furnace and a pollution control device in communication with the flue gas conduit for removing fly ash from the flue gas, a method of treating the fly ash comprising:
(a) mixing said fly ash with a glass material,
(b) introducing said mixture of fly ash and said glass material into a vitrification furnace,
(c) melting said glass material in said vitrification furnace to cause said fly ash to combine with said molten glass material, and
(d) discharging said combined glass material and fly ash from said vitrification furnace to produce an inert vitrified ash product.

10. The method according to claim 9 further comprising the step of introducing the flue gases from said vitrification furnace into said pollution control device.

11. The method according to claim 10 further comprising the step of introducing some of the flue gas from said flue gas conduit into said vitrification furnace for pre-heating said vitrification furnace.

12. The method according to claim 9 further comprising the step of pre-sorting glass from said solid waste material prior to introduction into said primary furnace, and utilizing said pre-sorted glass as said glass material for mixing with said fly ash.

13. In an apparatus for incinerating and treating solid waste material including an incinerator furnace having an ash discharge outlet and an incinerator flue gas outlet, a pollution control device having an inlet, a flue gas outlet and a fly ash outlet, and a flue gas conduit in fluid communication between said incinerator flue gas outlet and said inlet to said pollution control device, a device for treating said fly ash comprising:
(a) a vitrification furnace having upper and lower portions and opposite end portions and a melting chamber,
(b) a materials inlet conduit in the upper portion of said vitrification furnace,
(c) a gas outlet in the upper portion of said vitrification furnace for discharging the flue gases from said vitrification furnace,
(d) means for receiving fly ash from said fly ash outlet and a fusible material and for conveying said fly ash and said fusible material to said materials inlet conduit,
(e) means for heating said melting chamber at a temperature sufficient to melt said fusible material within said melting chamber,
(f) a discharge port for removing the molten mixture of fusible material and fly ash from said vitrification furnace, and
(g) means for conveying a flue gas from said vitrification furnace to the inlet of said pollution control device.

14. The invention according to claim 13 further comprising a bypass conduit in fluid communication between the flue gas conduit and said melting chamber for conveying a portion of the flue gas from said flue gas conduit into said melting chamber for pre-heating said melting chamber.

15. The invention according to claim 13 in which said vitrification furnace is disposed at an angle to the horizontal with one end portion of said vitrification furnace being the lower end portion and the opposite end portion being the upper end portion, said discharge outlet being in said lower end portion at a predetermined level to permit the flow of molten fusible material through said discharge opening at said predetermined level, and said materials inlet conduit being adjacent the upper end portion of said furnace above said predetermined level.

16. The invention according to claim 15 further comprising spaced inner and outer walls in said upper end portion of said vitrification furnace, providing a gas passage space, a gas outlet port in said inner end wall in said upper end portion of said furnace to permit the gases within said melting chamber to exit through said gas port into said gas space, said gas space in said upper end portion of said vitrification furnace being in fluid communication with said gas outlet of said vitrification furnace projecting through said outer wall, said materials inlet conduit projecting through said outer and said inner walls for communication with said melting chamber and extending through said gas space for pre-heating by flue gases in said gas space.

17. The invention according to claim 16 in which said means for heating said vitrification furnace comprises a burner and a fuel gas conduit extending through both said outer and inner walls and through said gas space to permit pre-heating of said hot gases in said fuel gas conduit.

* * * * *